(12) United States Patent
Yoshii

(10) Patent No.: US 7,154,067 B2
(45) Date of Patent: Dec. 26, 2006

(54) HARDENING METHOD AND APPARATUS UTILIZING LASER BEAMS

(75) Inventor: Toshikazu Yoshii, Tokyo-to (JP)

(73) Assignee: THK Co., Ltd., Tokyo-To (JP)

( * ) Notice: Subject to any disclaimer, the term of this patent is extended or adjusted under 35 U.S.C. 154(b) by 0 days.

(21) Appl. No.: 10/611,104

(22) Filed: Jul. 2, 2003

(65) Prior Publication Data

US 2004/0003874 A1 Jan. 8, 2004

(30) Foreign Application Priority Data

Jul. 3, 2002 (JP) ............................. P2002-195167

(51) Int. Cl.
*C21D 1/09* (2006.01)
(52) U.S. Cl. .............................. 219/121.85; 219/121.76
(58) Field of Classification Search ................ 148/525, 148/565; 219/121.76, 121.85; 430/320
See application file for complete search history.

(56) References Cited

U.S. PATENT DOCUMENTS

| | | | | |
|---|---|---|---|---|
| 4,456,811 A | * | 6/1984 | Hella et al. ............. | 219/121.85 |
| 4,533,400 A | * | 8/1985 | Benedict ...................... | 148/565 |
| 4,539,461 A | * | 9/1985 | Benedict et al. ............ | 148/565 |
| 5,827,588 A | * | 10/1998 | Snyder et al. ............. | 428/36.9 |
| 6,469,275 B1 | * | 10/2002 | Dulaney et al. ....... | 219/121.85 |
| 6,670,577 B1 | * | 12/2003 | Staver et al. .......... | 219/121.85 |
| 6,759,626 B1 | * | 7/2004 | Clauer et al. ............ | 219/121.6 |

* cited by examiner

*Primary Examiner*—Jonathan Johnson
(74) *Attorney, Agent, or Firm*—Westerman, Hattori, Daniels & Adrian, LLP.

(57) ABSTRACT

A material, such as track member for a linear motion guide, having a plurality of rows of portions to be hardened which are thermally influenced on each other, is hardened by emitting laser beams so as to simultaneously irradiate a plurality of rows of portions of the material to be hardened, and moving the laser beams irradiating the rows of portions to be hardened relatively in a longitudinal direction of the portions to be hardened. In this hardening process, the laser beam irradiation is performed such that, in a sectional plane perpendicular to an optical axis of the laser beam, a length of a laser beam irradiation shape in the longitudinal direction of the portion to be hardened is set to be longer than a length thereof in a direction perpendicular to the longitudinal direction.

7 Claims, 5 Drawing Sheets

HARDENING METHOD AND APPARATUS UTILIZING LASER BEAMS

BACKGROUND OF THE INVENTION

The present invention relates to hardening method and apparatus utilizing laser beams in which a laser beam irradiates a surface of a raw (or base) material.

When the laser beam irradiates the surface of the base material, a temperature of the localized surface layer of the material rises to a temperature suitable for heat treatment in a short time by a heat source of high energy density of the laser beam. When the heating is stopped, the heat is transmitted inside the material and then the material is rapidly quenched, thus performing a hardening treatment or working. A hardening technology utilizing the laser beam can provide such advantages as that localized hardening process can be made only to a necessary portion of the material, and in addition, oil, water or the like is not required for cooling and only a small strain due to the heat treatment is caused.

In prior art of certain technical field, a laser beam is utilized for irradiation to a raw material (which will be called merely "material" hereinafter) having a plurality of rows of portions to be hardened which are thermally influenced on each other. For example, as such material, there will be provided a track rail of a linear motion guide, and two rows of ball rolling surfaces extending in the longitudinal direction of the track rail are irradiated with the laser beams. The two rows of the ball rolling surfaces are formed closely, as shown in FIG. 9, in back-to-back close arrangement on both sides of a projected portion 1. In such formation, one of ball rolling surfaces 1a is first irradiated to carry out the first hardening process to thereby obtain a first-pass hardened layer 2a, and then, the other one of ball rolling surfaces 1b is irradiated to carry out the second hardening process to thereby obtain a second-pass hardened layer 2b.

This hardening method requires two times of laser beam irradiation, thus requiring much time and labor. In addition to this defect, there may cause a case that the hardened layer 2a of the one of the ball rolling surfaces 1a which was once hardened (first time hardening) is again heated and softened (in a state as shown by a reference numeral 3 in FIG. 9) by the second time laser beam irradiation, or cause a case that a work distance in the second-pass is shifted by the strain caused at the first-pass time, which will result in deterioration in hardening (hardened) quality, thus also providing defects.

SUMMARY OF THE INVENTION

An object of the present invention is therefore to substantially eliminate defects or drawbacks encountered in the prior art mentioned above and to provide a laser beam hardening method and apparatus capable of irradiating, with laser beam, a material having portions, in form of a plurality of rows, to be hardened which are influenced by each other.

The above object can be achieved, according to the present invention, generally by making longer, in a sectional plane perpendicular to an optical axis of the laser beam, a length of an laser beam irradiation shape in the longitudinal direction of the portion to be hardened than a length thereof in a direction perpendicular to the longitudinal direction at a time when a plurality of laser beams irradiate a plurality of rows of portions to be hardened which are mutually thermally influenced.

More specifically, the above object can be achieved by, in one aspect, providing a hardening method utilizing a laser beam for hardening a material having a plurality of rows of portions to be hardened which are thermally influenced by each other, the hardening method comprising the steps of:

emitting laser beams so as to simultaneously irradiate a plurality of rows of portions of the material to be hardened; and moving the laser beams irradiating the rows of portions to be hardened relatively to the portions to be hardened in a longitudinal direction of the portions to be hardened, wherein, in a sectional plane perpendicular to an optical axis of the laser beam, a length of a laser beam irradiation shape in the longitudinal direction of the portion to be hardened is longer than a length thereof in a direction perpendicular to the longitudinal direction.

According to this hardening method, there is not caused any problem or inconvenience, which may be caused at a time when a plurality of rows of portions to be hardened are hardened or quenched with a time difference, for example, inconvenience that a hardened layer of one hardened portion is softened by heat (thermal energy) application to another one portion to be hardened. Furthermore, since the plural portions to be hardened are influenced on each other at the time of heat applications thereto, the total energy required for heating the portions to be hardened can be relatively eliminated in comparison with a case that the hardening processes to the plural portions are performed with a time difference.

In addition, although the laser beams irradiating the plural portions to be hardened are set so as to accord with each other as much as possible so as not to cause a positional deviation in the laser beam moving direction, there is a case of causing the positional deviation by a certain reason. In a case where the total energy to be applied to the portions to be hardened is equal, an energy of a deviated portion ("e" see FIG. 3) between the two parallel laser beams can be reduced by making longer the length of the laser beam irradiation shape in the longitudinal direction of the portion to be hardened than the length thereof in the direction perpendicular to the longitudinal direction. Accordingly, the problem or inconvenience caused in the case that the hardening process is performed to the plural portions with time difference can be effectively eliminated.

In a preferred embodiment, it is desired that the laser beam is emitted from a laser diode.

The laser diode generally emits a laser beam having a elongated rectangular shape, and accordingly, it is easy to make longer the length of the laser beam irradiation shape in the longitudinal direction of the portion to be hardened than the length thereof in the direction perpendicular to the longitudinal direction.

Furthermore, the material to be hardened may be preferably a track member of a motion guide device in which a movable member is relatively movable with respect to the track member and these portions to be hardened are rolling member rolling surfaces on which rolling members disposed between the track member and the movable member roll. The track member has a bilaterally symmetric shape in section, the plural rows of portions to be hardened are formed in bilaterally symmetric shape in a sectional area of the track member, and the symmetric plural rows of portions are simultaneously irradiated with laser beams.

According to such preferred embodiment, the track member is less bent even by the hardening process.

In another aspect, there is also provided a hardening apparatus utilizing a laser beam for hardening a material having a plurality of rows of portions to be hardened which are thermally influenced on each other, the hardening apparatus comprising:

a work table on which the material is placed;

a laser beam irradiation device for emitting laser beams simultaneously to the plural rows of portions to be hardened; and a drive device for relatively moving the irradiating laser beams with respect to the portions to be hardened in a longitudinal direction thereof, wherein, in a sectional plane perpendicular to an optical axis of the laser beam, a length of an laser beam irradiation shape in the longitudinal direction of the portion to be hardened is longer than a length thereof in a direction perpendicular to the longitudinal direction.

In this aspect, it is desired that the laser beam irradiation device is a laser diode.

The nature and further characteristic features of the present invention will be made more clear from the following descriptions made in conjunction with the accompanying drawings.

DESCRIPTION OF THE PREFERRED EMBODIMENTS

Hardening method and apparatus utilizing laser beams according to the present invention are utilized for a hardening process in which the laser beam irradiates a raw or base material (which is called hereinlater merely "material") having a plurality of rows of portions to be hardened which are influenced on each other. As such material, there will be listed, for example, a track member of a motion guide apparatus such as a liner guide, a ball spline or a ball screw.

Figure 1:
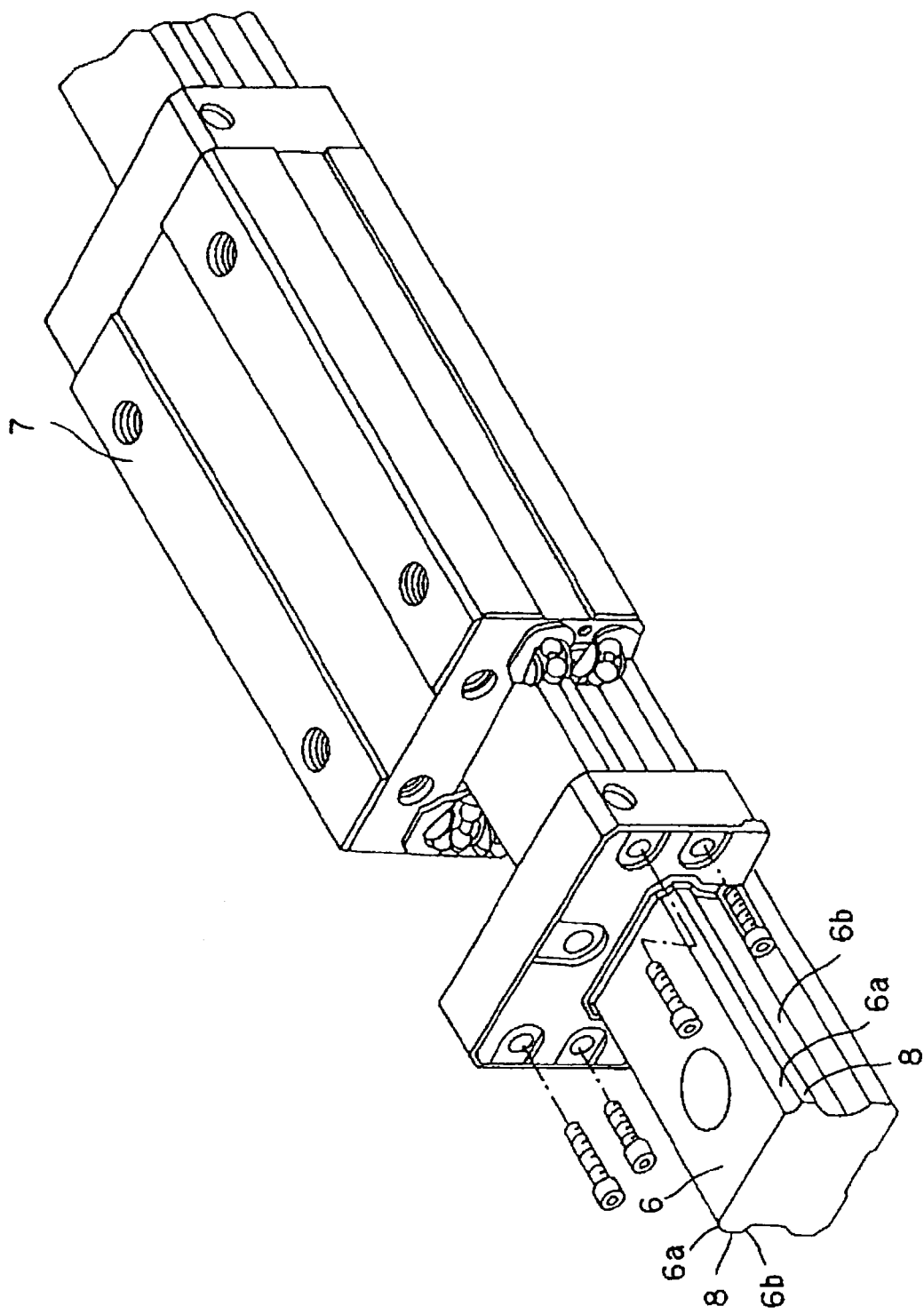
FIG. 1 is a perspective view of a linear guide to which the present invention is applicable.

With reference to FIG. 1 representing a linear guide, the linear guide comprises a track member 6 having an elongated scale and a movable member 7 relatively linearly movable with respect to the track member 6. The track member 6 is formed with a plurality of ball rolling grooves 6a, 6a, 6b, 6b as a plurality of rolling member rolling surfaces each extending in the longitudinal direction of the track member 6. On the other hand, the movable member 7 is formed with a plurality of ball circulation passages including loaded ball rolling grooves corresponding (opposing) to the ball rolling grooves of the track member 6. A number of balls are disposed, in an arranged manner, in the ball circulation passages so as to carry out the rolling motion in a ball rolling passage formed by the ball rolling grooves 6a, 6a, 6b, 6b of the track member 6 and the loaded ball rolling grooves of the movable member 7.

The track member is formed so as to provide a laterally symmetric shape in section, and accordingly, the plural rows of ball rolling grooves 6a, 6a, 6b, 6b are formed on the track member 6 to be laterally symmetric, and more specially, two rows of ball rolling grooves are formed on each of left and right sides of the track member 6 in section. Totally, four ball rolling grooves 6a, 6a, 6b, 6b are formed to both the side portions of the track member 6. These ball rolling grooves 6a, 6a, 6b, 6b constitute portions to be hardened (or quenched or quench hardened), which is hardened by using laser beams.

On each of the bilateral sides of the track member 6, two rows of ball rolling grooves 6a and 6b are formed so as to be formed in back-to-back arrangement with a projection (protruded ridge) 8 being interposed therebetween. The projection 8 is formed so as to have a relatively thin thickness. The laser bean irradiation is performed on the projection 8 with a small heat capacity to the extent that a heat generated by the laser beam irradiation on one ball rolling groove 6a causes a lowering of hardness (i.e. softening) of the other one ball rolling groove 6b on which the hardening process had already been performed.

Figure 2:
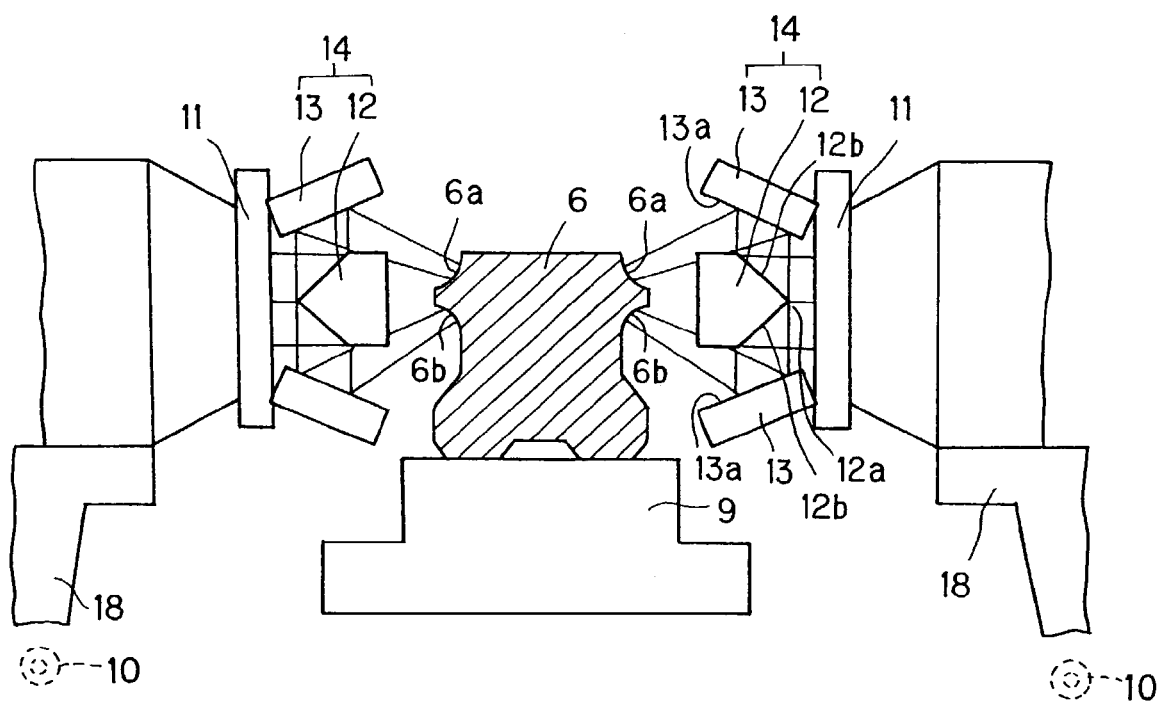
FIG. 2 is a schematic view of a hardening apparatus utilizing a laser beam according to one embodiment of the present invention as a sectional view in a direction perpendicular to the longitudinal direction of a track member of the hardening apparatus.

FIG. 2 illustrates a hardening apparatus utilizing the laser beam according to one embodiment of the present invention. With reference to FIG. 2, this hardening apparatus comprises a work table 9 on which the track member 6 is placed, a pair of laser (beam) generators 11, 11 as laser beam irradiation device for emitting the laser beams to a plurality of ball rolling grooves 6a, 6a, 6b, 6b formed on the track member 6, a pair of spectroscope units 14, 14 (which may be called merely spectroscopes hereinlater) and a drive mechanism 10 such as ball screw (schematically illustrated) for relatively moving the plural laser beams irradiating the ball rolling grooves 6a, 6a, 6b, 6b in the longitudinal direction thereof.

The paired laser generators 11, 11 and the paired spectroscopes 14, 14 are arranged one by one on each of left and right sides of the track member 6. Two rows of laser beams are generated and emitted, from each of these laser generators 11, 11 and spectroscopes 14, 14, simultaneously so as to irradiate the two rows of ball rolling grooves 6a and 6b on each side of the track member 6, and hence, four rows of laser beams are generated and emitted, by the paired laser generators 11, 11 and spectroscopes 14, 14 simultaneously to both the sides of the track member 6.

In the described embodiment, a laser diode is utilized as the laser generator 11. The use of the laser diode increases absorption ratio of the laser beam of a material and enhances laser beam oscillation efficiency, so that the hardening process can be done with low energy. In addition, an area for locating the device can be reduced and maintenance of the device can be easily done, thus being advantageous. Further, $CO_2$ laser, YAG laser or like may be also utilized.

Each of the spectroscopes 14 comprises a spectroscopic mirror 12 for dividing the laser beam generated from the laser generator 11 into two beams and a pair of reflecting mirrors 13, 13 for reflecting the divided laser beams so as to irradiate the two rows of ball rolling grooves 6a and 6b, respectively.

The spectroscopic mirror 12 has two reflecting surfaces 12b, 12b on both sides of its ridge edge 12a, and these reflecting surfaces 12b, 12b constitute substantially right angle (90 degrees) so as to divide the laser beam horizontally generated from the laser generator 11 into two beams in the vertical direction as viewed. The laser beam irradiation angles on these reflecting surfaces 12b, 12b and the reflecting surfaces 13a, 13a may be changed in accordance with the shape of, for example, the track member 6 to be hardened.

The reflecting mirror 13 has a structure such that the reflecting surface 13a is adjustable in its inclination angle so as to emit the laser beams to the ball rolling grooves 6a and 6b of the track member 6. In order to widen the hardening width of the ball rolling grooves 6a and 6b, the reflecting mirror 13 may be constituted to be vibrated to thereby vibrate the laser beams irradiating the ball rolling grooves 6a and 6b at predetermined frequency and amplitude by the vibration in the width direction of the grooves 6a and 6b.

The laser generators 1, 11 and the spectroscopes 14, 14 are supported by support tables or support carriers 18, 18, respectively, and the drive mechanism 10 will be constructed from a drive motor, a ball screw mechanism (FIG. 2), a linear motor or like so as to operate to move the support table 18 relatively with respect to the work table 9 in the longitudinal direction of the ball rolling grooves 6a and 6b.

Figure 3:
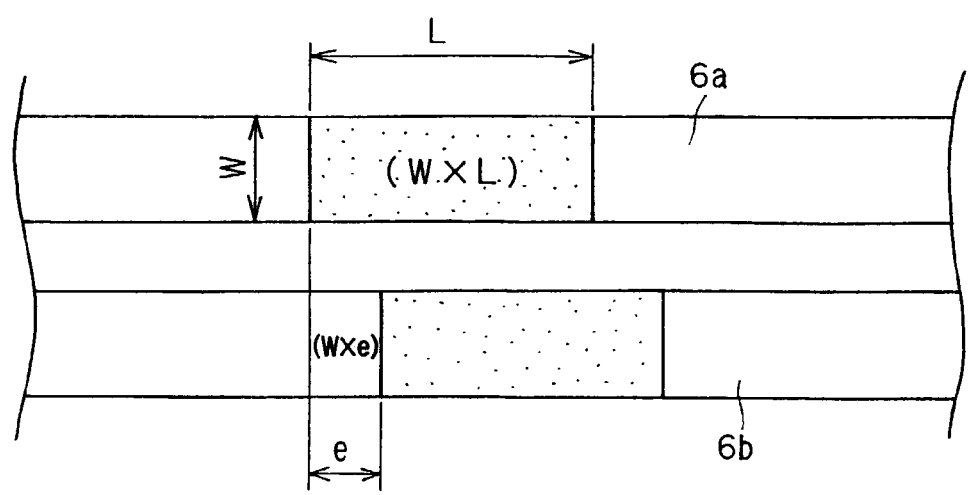
FIG. 3 is an illustration showing laser beam irradiating shapes to a two rows of ball rolling grooves formed to the track member.

FIG. 3 shows the laser beam irradiating shape on the two rows of ball rolling grooves 6a and 6b of the track member 6. Further, the laser beam irradiation state is set to show rectangular shape, in section, perpendicular to the optical axis of the laser beam, and a length L of the irradiating shape in the longitudinal direction of the ball rolling groove 6a (6b) is also set to be longer than a width W in the direction normal to the longitudinal direction. As a result, as shown in FIG. 3, the laser beam shape irradiating the two rows of the ball rolling grooves 6a and 6b provides a rectangular shape elongated in the longitudinal direction. In the case where the laser diode is utilized as laser generator 11, such rectangular irradiation state is generally obtainable. The two ball rolling grooves 6a and 6b have substantially the same irradiation shape and provide substantially the same energy density.

Figure 4:
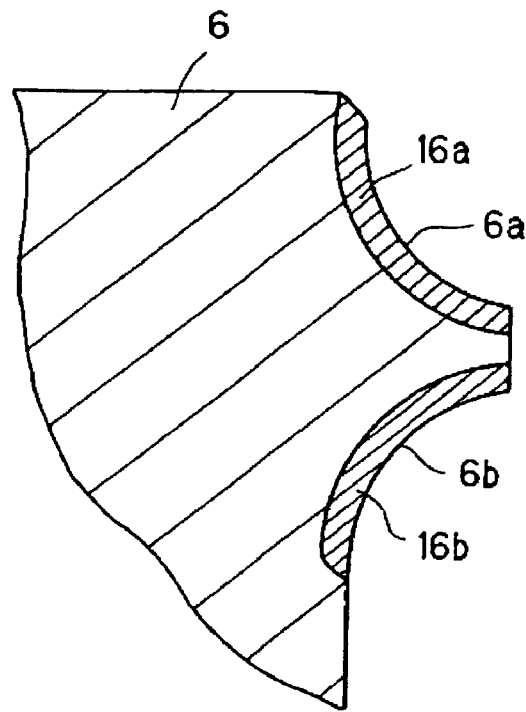
FIG. 4 is a sectional view, in an enlarged scale, of a hardened layer of the ball rolling groove.

The laser beams respectively applied to the ball rolling grooves 6a and 6b are relatively moved along the longitudinal direction of the grooves 6a and 6b. According to this operation, the hardening process is effected only to the surface layers along the contours of the ball rolling grooves 6a and 6b as shown in FIG. 4. In this hardening process, the depth of hardened layers 16a and 16b will be determined in accordance with the output capacity of the laser generator 11 and the feed speed of the drive mechanism.

Further, the ball rolling grooves 6a and 6b have uneven surfaces, so that a distance (i.e., work distance) from the laser generator 11 to the work may differ at various portions, and according to the difference of the work distance, the energy density of the laser beam will be changed. In this viewpoint, in the present embodiment, the laser beam is divided so as to respectively irradiate the two rows of the ball rolling grooves 6a and 6b. Accordingly, the difference in the work distance can be remarkably reduced and the hardening process can be done uniformly in quality in comparison with a case wherein the laser beam is not divided at the irradiation and the ball rolling grooves 6a and 6b are simultaneously irradiated from oblique directions with respect to the grooves 6a and 6b.

As shown in FIG. 3, the laser beam irradiations to the two rows of the ball rolling grooves 6a and 6b are performed in conformity with each other possibly in their positions in the laser beam moving directions. However, by to a certain inevitable cause, there may cause a positional deviation (offset) such as "e" shown in FIG. 3. In such occasion, in the described embodiment, the length L of the laser beam irradiation shape is made longer than the width W as mentioned before, so that an area of a deviated portion (W×e) is made relatively small in ratio with respect to the total irradiated area (W×L). Accordingly, in a case where total energies applied to the ball rolling grooves are equal to in each irradiation, the energy of the deviated portion "e" between the two parallel laser beams will be made small. Thus, there will less cause an inconvenient case that the hardened layer of one of the ball rolling grooves is softened by the heat applied thereafter to the other one of the ball rolling grooves.

Figure 5:
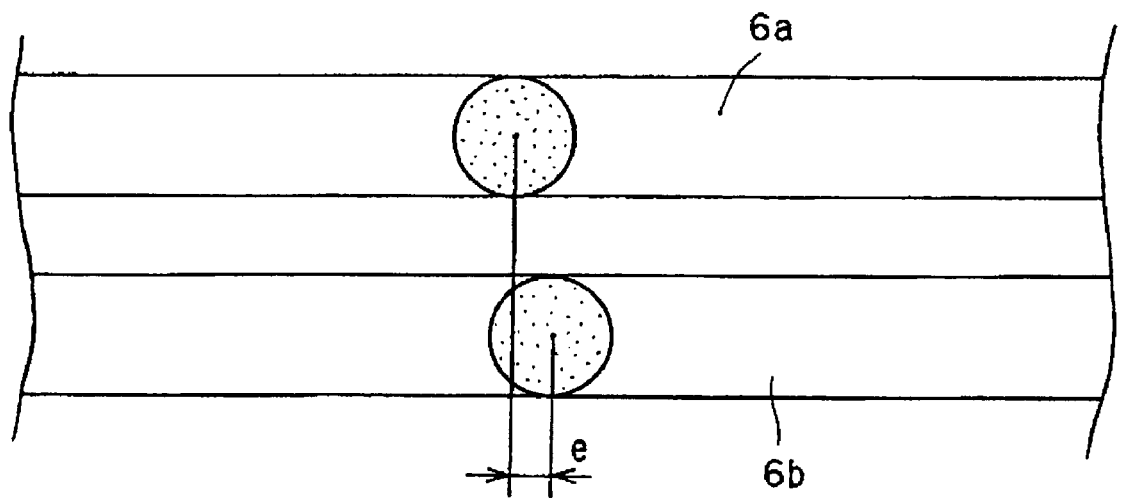
FIG. 5 is an illustration showing comparative examples of the laser beam irradiation shapes.
Figure 6:
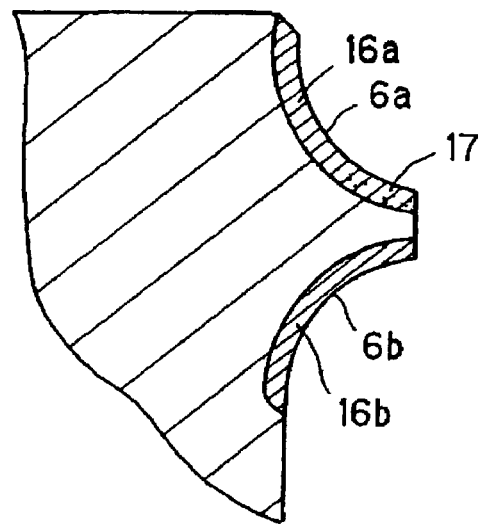
FIG. 6 is a sectional view, in an enlarged scale, of a comparative example of the hardened layer of the ball rolling groove.

In the above connection, FIGS. 5 and 6 represent a case of another laser irradiation shape in comparison with the case of FIGS. 3 and 4.

In this comparative example, the laser beam irradiation shape is set to show a circular shape. In such example, when the positional deviation "e" is caused between the parallel laser beams, the area ratio of the deviated portion with respect to the total irradiation area becomes large, and hence, the energy of the deviated portion "e" between the two parallel laser beams will become large in comparison with the case of FIG. 3. Thus, there will easily generate a softened portion 17 in the hardened layer 16a of one 6a of the ball rolling grooves by the heat applied thereafter to the other one 6b of the ball rolling grooves.

The irradiation shape of the laser beam is not limited to the rectangular shape as mentioned above and may be set to be elliptic shape or shape that semi-circular portions are applied to both ends of a central rectangular portion, as far as the longitudinal length L of the leaser beam irradiation is larger than the width W thereof. Further, although the $CO_2$ laser beam or YAG laser beam may be also utilized as such laser beam, these laser beams usually show circular irradiating shape, so that it may be required as occasion demands to use a slit or specific mirror In the present embodiment in which the bilaterally two, i.e., totally four, ball rolling grooves 6a, 6a, 6b, 6b of the track member 6 are irradiated simultaneously with four laser beams. If only one side grooves 6a and 6b are irradiated, there is a fear that the track member 6 is adversely bent by the laser beam irradiation, and at an occasion that the track member 6 is bent, the work distance will be also changed, resulting in deterioration in the hardening quality or causing necessity for correction to the bent portion after the irradiation. These defects could be eliminated by the simultaneous irradiation of the laser beams to four ball rolling grooves 6a, 6a, 6b, 6b on both the sides of the track member 6 to thereby prevent the track member 6 from being bent.

Figure 7:
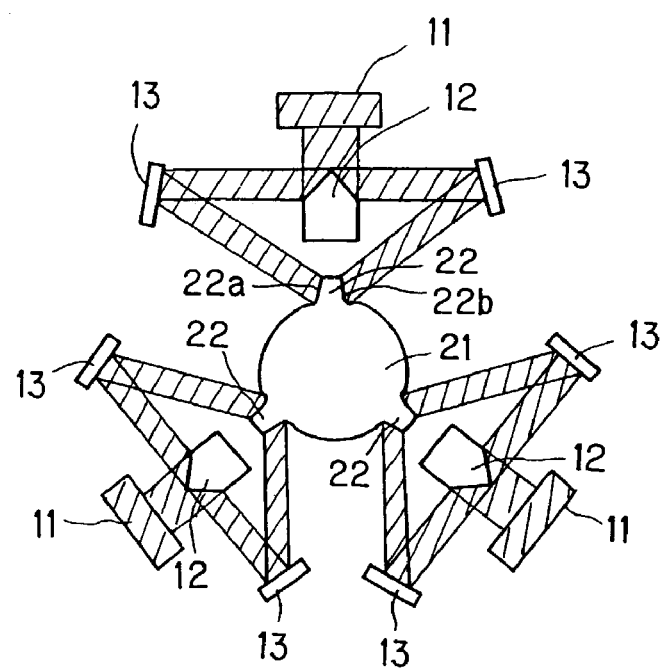
FIG. 7 is a schematic sectional view showing a hardening condition to a spline shaft of a ball spline.

FIG. 7 represents an example of a case that a spline shaft 21 of a ball spline as a track member of a motion guide device is hardened.

With reference to FIG. 7, the spline shaft 21 is formed with three projected rows of ridges 22, 22, 22 extending in the axial direction with equal interval on an outer periphery of the spline shaft 21. A pair of ball rolling grooves 22a and 22b are formed on both the sides of each of the ridges 22 in back-to-back arrangement. The spline shaft 21 has a bilaterally symmetric shape in section and totally six rows of ball rolling grooves 22a—and 22b—are formed in bilaterally symmetric arrangement. In conformity with the arrangement of these three pairs of ball rolling grooves 22a and 22b, three laser generators and spectroscopes are also arranged so that one laser generator and one spectroscope irradiate the one set of ball rolling grooves 22a and 22b simultaneously. And total six rows of the ball rolling grooves 22a—and 22b—are simultaneously irradiated by three laser generator and spectroscope. Further, the structures of the laser generators and spectroscopes in this embodiment are the same as those shown in FIG. 2, and the details thereof are hence omitted from the description.

In this example, the laser beams irradiating the ball rolling grooves 22a and 22b are moved relatively in the longitudinal direction thereof, and in the sectional plane perpendicular to the optical axis of the laser beam, the irradiating shape of the laser beam in the longitudinal direction of the ball rolling groove is set to be longer than the length of the irradiating shape in a direction normal to the longitudinal direction thereof.

Figure 8:
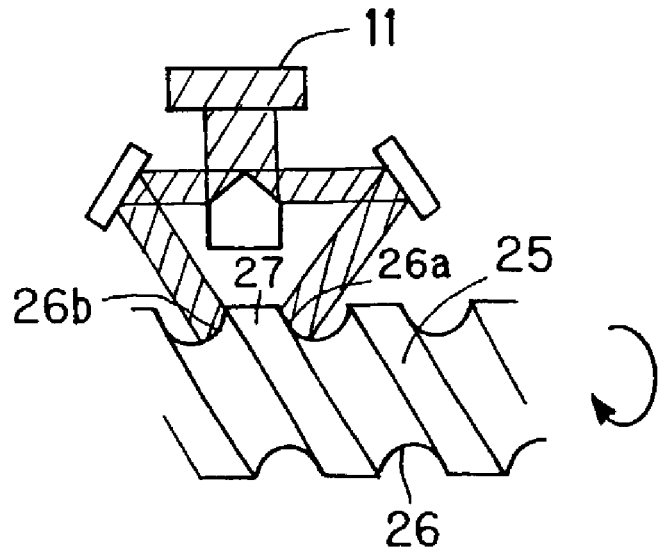
FIG. 8 is a schematic sectional view showing a hardening condition to a screw shaft of a ball screw.
Figure 9:
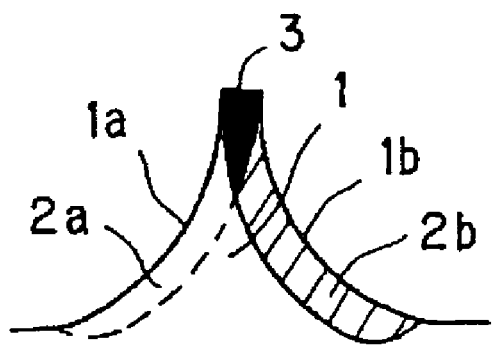
FIG. 9 is a sectional view of a track rail to which a conventional hardening method is applied.

FIG. 8 illustrates one example of a state that a screw shaft 25 of a ball screw as a track member of a motion guide device is hardened. The screw shaft 25 is formed with a spiral ball rolling groove 26. The ball rolling grooves 26a and 26b, each composing ¼ (quarter) circular-arc portion, are formed in back-to-back arrangement with respect to a thread ridge 27. In this example, the laser generators and the spectroscopes of the types similar to those mentioned with reference to the former embodiments will be utilized for irradiating, with the laser beam, the ¼ circular-arc portion of the ball rolling grooves 26a and 26b, simultaneously.

In this example, the laser beam irradiating the ball rolling grooves 26a and 26b are relatively moved in the longitudinal direction thereof, i.e., along the spiral of the grooves. More specifically, the laser beam is relatively moved along the spiral of the groove by moving the screw shaft 25 in the axial direction thereof while being rotated.

In the sectional plane perpendicular to the optical axis of the laser beam, the irradiating shape of the laser beam in the longitudinal direction of the ball rolling groove is also set to be longer than the length of the irradiating shape in a direction normal to the longitudinal direction thereof.

Incidentally, in a case where a plurality of rows of the screw shaft are hardened, a plurality of laser generators and spectroscopes in conformity with, in number, the rows of the threads of the screw shaft are arranged. In order to prevent the screw shaft from bending, it is desired to arrange the plural laser generators and spectroscopes at equal intervals in the circumferential direction of the screw shaft.

Further, it is to be noted that the present invention is not limited to the described embodiments and many other changes and modifications may be made without departing from the scopes of the appended claims.

For example, the raw material is not limited to the track member of the motion guide device as far as the material has a plurality of rows of portions to be hardened which are thermally influenced on each other. In addition, the rolling member rolling surface of the motion guide device is not limited to the ball rolling groove and may be substituted with a roller rolling surface along which rollers roll. Furthermore, the structure in which the track member is moved with respect to the laser beam may be adopted in substitution for the movement of the laser beam with respect to the track member.

The present application claims priority under 35 U.S.C § 119 to Japanese Patent Application No.2002-195167 filed Jul. 3, 2002 entitled "HARDENING METHOD AND APPARATUS UTILIZING LASER BEAMS". The contents of that application are incorporated herein by reference in their entirety.

What is claimed is:

1. A hardening method utilizing a laser beam for hardening a material having a plurality of rows of portions to be hardened which are thermally influenced by each other, said hardening method comprising the steps of:

emitting laser beams so as to simultaneously irradiate a plurality of rows of portions of the material to be hardened; and moving the laser beams irradiating the rows of portions to be hardened relative to the portions to be hardened in a longitudinal direction of the portions to be hardened, wherein the focused laser beam illuminates a spot wherein the length of the spot is greater than the width and wherein the length extends in the longitudinal direction of the portion to be hardened.

2. The hardening method according to claim 1, wherein the laser beam is emitted from a laser diode.

3. The hardening method according to claim 1, wherein said material to be hardened is a track member of a motion guide device in which a movable member is relatively movable with respect to the track member and said portions to be hardened are rolling member rolling surfaces on which rolling members disposed between the track member and the movable member roll.

4. The hardening method according to claim 3, wherein the track member has a bilaterally symmetric shape in section, the plural rows of portions to be hardened are formed in bilaterally symmetric shape in a sectional area of the track member, and the symmetric plural rows of portions are simultaneously irradiated with laser beams.

5. A hardening apparatus utilizing a laser beam for hardening a material having a plurality of rows of portions to be hardened which are thermally influenced by each other, said hardening apparatus comprising:

a work table on which the material is placed;

a laser beam irradiation device for emitting laser beams simultaneously to the plural rows of portions to be hardened; and a drive device for relatively moving the irradiating laser beams with respect to the rows of portions to be hardened in a longitudinal direction thereof, wherein the focused laser beam illuminates a spot wherein the length of the spot is greater than the width and wherein the length extends in the longitudinal direction of the portion to be hardened.

6. The hardening apparatus according to claim 5, wherein said laser beam irradiation device is a laser diode.

7. A hardening apparatus utilizing a laser beam for hardening a material having a plurality of rows of portion sot be hardened which are thermally influenced by each other, said hardening apparatus comprising:

a work table on which the material is placed;

a laser beam irradiation device for emitting laser beams simultaneously to the plural rows of portions to be hardened; and a drive device for relatively moving the irradiating laser beams with respect to the rows of portions to be hardened in a longitudinal direction thereof, wherein, the focused laser beam illuminates a spot wherein the length of the spot is greater than the width and wherein the length extends in the longitudinal direction of the portion to be hardened, and wherein said material to be hardened is a track member of a motion guide device in which a movable member is relatively movable with respect to the track member and said portions to be hardened are rolling member rolling surfaces on which rolling members disposed between the track member and the movable member roll.

* * * * *